United States Patent
Louh

(10) Patent No.: US 8,049,874 B2
(45) Date of Patent: Nov. 1, 2011

(54) METHOD FOR MEASURING ILLUMINANCE OF LAMP

(75) Inventor: Sei-Ping Louh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 311 days.

(21) Appl. No.: 12/330,563

(22) Filed: Dec. 9, 2008

(65) Prior Publication Data
US 2009/0316142 A1 Dec. 24, 2009

(30) Foreign Application Priority Data
Jun. 20, 2008 (CN) .......................... 2008 1 0302249

(51) Int. Cl.
*G01J 1/00* (2006.01)
(52) U.S. Cl. ....................................... 356/121; 356/213
(58) Field of Classification Search .................. 356/121, 356/213, 218
See application file for complete search history.

(56) References Cited

U.S. PATENT DOCUMENTS
2006/0007428 A1 * 1/2006 Lin et al. ........................ 356/121
2009/0177426 A1 * 7/2009 Dodds et al. ..................... 702/85

FOREIGN PATENT DOCUMENTS
JP P2000-258246 A 9/2000

* cited by examiner

*Primary Examiner* — Layla Lauchman
(74) *Attorney, Agent, or Firm* — Altis Law Group, Inc.

(57) ABSTRACT

A method for measuring illuminance of a lamp utilizes at least one illuminance meter and a rotary apparatus. The lamp is installed on the rotary apparatus. The lamp emits light and projects onto an irradiation area. A measurement area is defined from within the irradiation area. The measurement area is evenly divided into n sub-measurement areas, wherein n is a natural number. The n sub-measurement areas are centrosymmetric. At least one illuminance meter measuring illuminance of the lamp is disposed on one of the n sub-measurement areas. The rotary apparatus drives the lamp to rotate 360/n° in turn. The single illuminance meter measures illuminance of the lamp in other (n−1) sub-measurement areas.

6 Claims, 1 Drawing Sheet

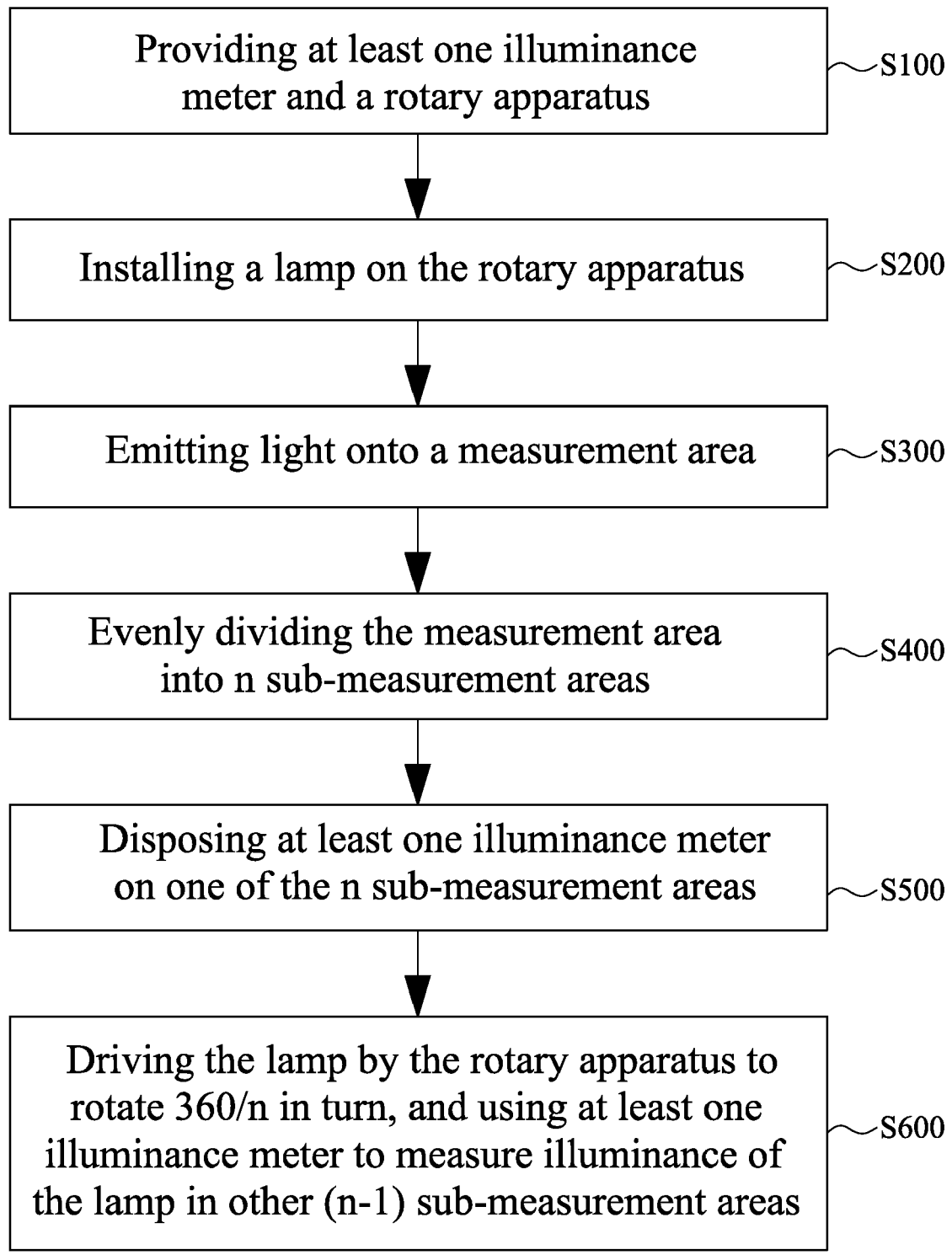

METHOD FOR MEASURING ILLUMINANCE OF LAMP

BACKGROUND

1. Field of the Invention

The disclosure relates to methods for measuring illuminance and, more particularly, to a method for measuring illuminance of a lamp.

2. Description of Related Art

Traditionally, illuminance of a lamp is measured by placing the lamp in a predetermined position, from which the lamp irradiates an irradiation area. The irradiation area is divided into a plurality of measurement areas. Each measurement area has at least one illuminance meter at the same time. Such methods require simultaneous deployment of many illuminance meters.

Therefore, a convenient method of measuring illuminance of a lamp is desirable in order to overcome the described limitations.

BRIEF DESCRIPTION OF THE DRAWINGS

The FIGURE is a flowchart of a preferred embodiment of a method for measuring illuminance of a lamp.

DETAILED DESCRIPTION OF CERTAIN INVENTIVE EMBODIMENTS

The FIGURE is a flowchart of a method for measuring illuminance of a lamp in accordance with a preferred embodiment. In step S100, at least one illuminance meter and a rotary apparatus are provided. Specifically, the number of the illuminance meters is determined by a measurement area.

In step S200, the lamp is installed on the rotary apparatus. The rotary apparatus is configured for rotating the lamp around an axis.

In step S300, the lamp emits light and projects onto an irradiation area. A symmetrical area is selected from the irradiation area and defined as a measurement area. Advantageously, the measurement area is a square or a circle. Preferably, a length of each side of the square is 3H, or a radius of the circle is 3H, wherein H is a distance between the lamp and the center of the irradiation area.

In step S400, the measurement area is evenly divided into n sub-measurement areas, wherein n is a natural number. The n sub-measurement areas are centrosymmetric.

In step S500, at least one illuminance meter is disposed on one of the n sub-measurement areas for measuring illuminance of the lamp light projected on this area.

In step S600, the rotary apparatus rotates the lamp 360/n in turn, thereby another portion of the lamp light is projected onto the measurement area. The same illuminance meter measures illuminance of the lamp in other (n−1) sub-measurement areas. Understandably, the larger value of n indicates a higher accuracy measurement, but it also increases the time for measurement. In general conditions, the value of n is less than or equal to 8.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for measuring illuminance of a lamp, the method comprising:
   providing at least one illuminance meter and a rotary apparatus;
   installing the lamp on the rotary apparatus;
   emitting light onto a measurement area;
   evenly dividing the measurement area into n sub-measurement areas;
   disposing the at least one illuminance meter in one of the n sub-measurement areas;
   using the at least one illuminance meter to measure illuminance of the lamp in the one of the n sub-measurement areas; and
   driving the lamp by the rotary apparatus to rotate 360/n° in turn, and using the at least one illuminance meter to measure illuminance of the lamp in other (n−1) sub-measurement areas;
   wherein the n is less than or equal to 8.

2. The method according to claim 1, wherein the measurement area is a square, a length of each side of the which is 3H, wherein H is a distance between the lamp and the irradiation area.

3. The method according to claim 1, wherein the measurement area is a circle, a radius of which is 3H, wherein H is a distance between the lamp and the irradiation area.

4. The method according to claim 1, wherein the n sub-measurement areas are centrosymmetric.

5. A method for measuring illuminance of a lamp, the method comprising:
   providing at least one illuminance meter and a rotary apparatus;
   installing the lamp on the rotary apparatus;
   emitting light onto a measurement area;
   evenly dividing the measurement area into n sub-measurement areas;
   disposing the at least one illuminance meter in one of the n sub-measurement areas;
   using the at least one illuminance meter to measure illuminance of the lamp in the one of the n sub-measurement areas; and
   driving the lamp by the rotary apparatus to rotate 360/n° in turn, and using the at least one illuminance meter to measure illuminance of the lamp in other (n−1) sub-measurement areas;
   wherein the measurement area is a square, a length of each side of the which is 3H, wherein H is a distance between the lamp and the irradiation area.

6. A method for measuring illuminance of a lamp, the method comprising:
   providing at least one illuminance meter and a rotary apparatus;
   installing the lamp on the rotary apparatus;
   emitting light onto a measurement area;
   evenly dividing the measurement area into n sub-measurement areas;
   disposing the at least one illuminance meter in one of the n sub-measurement areas;
   using the at least one illuminance meter to measure illuminance of the lamp in the one of the n sub-measurement areas; and driving the lamp by the rotary apparatus to rotate 360/n° in turn, and using the at least one illuminance meter to measure illuminance of the lamp in other (n−1) sub-measurement areas;

wherein the measurement area is a circle, a radius of which is 3H, wherein H is a distance between the lamp and the irradiation area.

\* \* \* \* \*